(12) United States Patent
Nakada et al.

(10) Patent No.: US 7,512,660 B2
(45) Date of Patent: Mar. 31, 2009

(54) MESSAGE HANDLING METHOD, MESSAGE HANDLING APPARATUS, AND MEMORY MEDIA FOR STORING A MESSAGE HANDLING APPARATUS CONTROLLING PROGRAM

(75) Inventors: Akifumi Nakada, Kawasaki (JP);
Hajime Tsuchitani, Kamakura (JP);
Osamu Furusawa, Sagamihara (JP);
Toshihiko Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/034,697

(22) Filed: Jan. 13, 2005

(65) Prior Publication Data

US 2005/0190761 A1    Sep. 1, 2005

Related U.S. Application Data

(60) Continuation of application No. 09/832,488, filed on Apr. 11, 2001, which is a division of application No. 09/090,506, filed on Jun. 4, 1998, now abandoned.

(30) Foreign Application Priority Data

Jun. 10, 1997    (JP)    ................................... 9-152426

(51) Int. Cl.
*G06F 15/16*    (2006.01)
(52) U.S. Cl. .............................. 709/206; 704/9; 709/230
(58) Field of Classification Search ..................... 704/9; 709/206, 230
See application file for complete search history.

(56) References Cited

U.S. PATENT DOCUMENTS 5,603,031 A    2/1997    White et al. ................. 395/683

(Continued)

FOREIGN PATENT DOCUMENTS

EP    036105 A2    4/1990

(Continued)

OTHER PUBLICATIONS

Design and Implementation of the background jobs using mobile agents on the distributed system (Yoshie et al., The Institute of Electronics, Information and Communication Engineers, Technical Report of IEICE, AI96-22 (Nov. 1996) (pp. 1-9).

(Continued)

*Primary Examiner*—Jason D Cardone
*Assistant Examiner*—Ajay Bhatia

(57) ABSTRACT

A communication system is provided that is capable of flexibly dealing with conversations among agents. An agent includes a software part which performs operations that represent the functions of a human ear and a mouth. In generating a conversation, an agent communication language, which is similar to a human conversation, is prepared and sent to a conversation part as a message packet. The conversation part then generates a plurality of conversation threads one for each unit of conversation and converse with a plurality of nodes in parallel and asynchronously. On the other hand, in another node which receives the message packet, a protocol manager receives the data (message packet) from a network and passes it to the conversation part. The conversation part understands the message packet and executes the content. The conversation part can move to other places along with a mobile agent.

11 Claims, 12 Drawing Sheets

U.S. PATENT DOCUMENTS

| | | | |
|---|---|---|---|
| 6,144,962 A * | 11/2000 | Weinberg et al. | 707/10 |
| 6,594,684 B1 * | 7/2003 | Hodjat et al. | 709/202 |
| 6,745,197 B2 * | 6/2004 | McDonald | 707/102 |
| 6,772,109 B2 * | 8/2004 | Tsuchitani et al. | 704/2 |
| 2003/0093419 A1 * | 5/2003 | Bangalore et al. | 707/3 |

FOREIGN PATENT DOCUMENTS

| | | |
|---|---|---|
| JP | 59-157760 | 8/1984 |
| JP | 03-179527 | 8/1991 |
| JP | 06332724 A | 12/1994 |
| JP | 06342375 A | 12/1994 |
| JP | 07182174 | 7/1995 |
| JP | 07302235 A | 11/1995 |
| JP | 08137874 A | 5/1996 |
| JP | 2007200312 A * | 8/2007 |
| WO | 93/25962 | 12/1993 |

OTHER PUBLICATIONS

Venner, Bill, "The architecture of aglets." JavaWorld [online], Apr. 1997 IDG Company. http://www.javaworld.com/javaworld/jw-04-1997/jw-04-hood-p2.html.

"Mole-A Java Based Mobile Agent Systems", Proceedings of the ECOOP 1996 Workshop on Mobile Object Systems, Markus Strasser et al., 1996, pp. 28-35.

Shibata et al., "Message Driven Thread architecture MD 1", Research Report by Information Processing Society of Japan, vol. 96, No. 80, Aug. 1996.

"HI UX/WE2 H2 DCE Application Development Guide Summary Thread Remote Procedure Call" (2nd Edition), p. 14-24 - 14-26.

* cited by examiner

FIG.7

| Message Type | Conversation Content Monitoring Part |
|---|---|
| ask-if | ask-if Monitoring Part |
| sorry | sorry Monitoring Part |
| ... | ... |
| recruit-all | recruit-all Monitoring Part |

| Interpreter | Agent Communication Language | Describing Language | Ontology |
|---|---|---|---|
| interprter A | KQML | Prolog | Stock |
| interprter B | FIPA | SL | Stock |
| ... | ... | ... | ... |
| interprter X | KQML | KIF | Yellow Page |

| Agent Communication Language | Translator |
|---|---|
| KQML | KQML→FIPA |
| ... | ... |
| FIPA | FIPA→KIF |

340

MESSAGE HANDLING METHOD, MESSAGE HANDLING APPARATUS, AND MEMORY MEDIA FOR STORING A MESSAGE HANDLING APPARATUS CONTROLLING PROGRAM

CROSS-REFERENCE TO RELATED APPLICATIONS

This is a continuing application of U.S. patent application Ser. No. 09/832,488, filed Apr. 11, 2001, which is a divisional of U.S. patent application Ser. No. 09/090,506, filed Jun. 4, 1998, now abandoned.

BACKGROUND OF THE INVENTION

1. Field of the Invention

This invention relates to a data processing technique, and more particularly, to an improved data processing method for supporting communications among two or more nodes on a network in a distributed computer environment.

2. Description of the Related Art

There is a mobile agent technology in the art in which an internal condition is moved to a place which is provided in a server existing on a network in a distributed computer environment to form an instruction in the place where the internal condition is moved Reference is made to U.S. Pat. No. 5,603,021, issued Feb. 11, 1997, entitled "System and Method for Distributed Computation Based Upon the Movement, Execution, and Interaction of Processes In A Network", by White et al., Japanese unexamined Patent Publication No.: 7-182174, and an article entitled "Latest Internet Technology, special edition of Nikkei Communication", by Fumihiko Nishida, Susumu Fujiwara et al., pp. 104-117, Nikkei B P.

Mobile agents, operating within the above mentioned mobile agent technology, make a contact to other agents in the moved-to place, i.e. a mobile agent or a resident agent, and may be served as appropriate. A place is a location provided by a server existing on the network to which the agent is moved and which supports a contact among agents. Preferably, the server accommodates the differences between the hardware and between the platforms.

The mobile agent technology enables a mobile agent to act as a proxy of a human being in handling work such as, for example, dynamically adjusting a schedule of internal meetings in compliance with the schedule of attendees and the status of reservations of conference rooms, and also acquiring desired information distributed on the network.

In the prior art mobile agents, however, it can be difficult to realize a flexible, smooth information exchange and coordination among agents because the communications among agents are realized by a conventional method call (subroutine call) or by low level message passing. Further, it is often a requirement to define the processing of a stereotypical conversation in order to communicate by using an agent. This requirement can result in a load to a user of an agent. Furthermore, it can be difficult to communicate between different types of agents because no agent communication language is used to realize the communications among a variety of agents.

It can be appreciated that a "conversation" between human beings generally consists of steps in which:

1. A speaker prepares a content to be spoken in order to convey the speaker's intent to a listener;
2. The speaker then begins to speak;
3. The listener listens to the speech and understands the flow of the conversation;
4. The listener associates the speech with the background of the speech from what the listener has experienced;
5. The listener understands the content of the speech; and
6. The listener takes an action as a result.

If a messaging system of a computer is defined as one which simulates the message processing of a natural language and is designed for recycling by patterning a conversation in this way, a message which is closer to a natural language than in prior art message processing systems can be processed. As a result, an intelligent message system can be constructed which is more user friendly and allows a series of packets having a certain context to be exchanges with the flow of contexts being followed.

OBJECTS AND ADVANTAGES OF THE INVENTION

It is a first object and advantage of this invention to provide a communication system which is capable of having a conversation with an agent communication language which is intuitively and easily understandable to a human being, and also having an agent (mobile or resident agent) to communicate.

It is another object and advantage of this invention to provide a communication system which enables a conversation among agents (mobile or resident agents) to proceed concurrently and asynchronously.

It is a further object and advantage of this invention to provide a communication system in which agents can communicate to each other without knowledge of a variety of agent communication languages and communication protocols.

It is still another object of this invention to provide a communication system which realizes high speed parallel conversation processing.

It is still a further object of this invention to reduce the work and the time required for developing and maintaining a program as much as possible in providing a support to communication among agents.

It is a further object of this invention to provide a message processing system which is capable of flexibly dealing with conversations among agents.

It is another object of this invention to provide a message processing system which results in less load to a communication network.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention, wherein a communication system is provided which is capable of having a conversation with an agent communication language that is intuitively and easily understandable to a human being.

This invention provides an agent with a software part (agent communication system) which performs operations that represent the functions of a human ear and a mouth. In such an agent communication system, the functions of the ear are provided in the form of an API (Application Program Interface) "handleMessage", while the functions of the mouth are provided in the form of an API "sendMessage". In the preferred embodiment of this invention, these API's are implemented as an object oriented programming language method of an agent communication language manager object for an agent communication system.

In generating a conversation, an agent prepares an agent communication language (ACL) which represents a human conversation and sends it by passing it to the sendMessage method. A message packet contains a sender field and a destination field by which the agent communication system can recognize the location of a conversation partner.

On the other hand, in the node which receives the message packet, the data (message packet) from the network is received by a protocol manager which is a component that processes a data coming through the network and which passes it to the handleMessage method of the agent communication language manager object. The handleMessage method understands the message packet and executes the content.

According to one aspect of this invention, the agent communication system, upon transmission or receipt of a message packet, determines whether or not a new conversation is initiated and generate a new conversation thread when it is determined that a new conversation is initiated. The conversation thread enables conversations to proceed concurrently and asynchronously among a plurality of agents (mobile or resident agents).

According to another aspect of this invention, the functions of the ear and the mouth are provided to an agent simply by instantiating the agent communication language manager object.

According to one aspect of this invention, a message processing method is provided for execution by a message processor which is connected to a network and has a conversation thread control part that is capable of generating a plurality of conversation threads, the method includes the steps of: detecting a message packet containing a destination information and a conversation thread identifying information; determining whether or not a conversation thread corresponding to the conversation thread identifying information contained in the message packet exists in the message processor; generating a new conversation thread when it is determined that the corresponding conversation thread does not exist in the message processor; and sending the message packet to a destination which corresponds to said destination information.

According to another aspect of this invention, a message processing method is provided for execution by a message processor which is connected to a network and has a conversation thread control part that is capable of generating a plurality of conversation threads, the method includes the steps of: detecting a message packet containing a destination information, a conversation thread identifying information and a content information; determining whether or not a conversation thread corresponding to the conversation thread identifying information contained in the message packet exists in the message processor; generating a new conversation thread when it is determined that the corresponding conversation thread does not exist in the message processor; converting the message packet to a protocol which corresponds to the network to which the message processor is connected; and sending the message packet to a destination which corresponds to said destination information.

According to still another aspect of this invention, a message processing method is provided for execution by a message processor which is connected to a network and has a conversation thread control part that is capable of generating a plurality of conversation threads, the method includes the steps of: detecting a message packet containing a conversation thread identifying information; determining whether or not a conversation thread corresponding to the conversation thread identifying information contained in the message packet exist in the message processor; and generating a new conversation thread when it is determined that the corresponding conversation thread does not exist in the message processor.

According to a further aspect of this invention, a message processing method is provided for execution by a message processor which is connected to a network and has a conversation thread control part that is capable of generating a plurality of conversation threads, the method includes the steps of: detecting a message packet containing a conversation thread identifying information and a content information; determining whether or not a conversation thread corresponding to the conversation thread identifying information contained in the message packet exist in the message processor; and passing a control to the corresponding conversation thread when it is determined that the corresponding conversation thread exists in the message processor.

According to a still further aspect of this invention, a message processing method is provided for execution by a message processor which is connected to a network and has a conversation thread control part that is capable of generating a plurality of conversation threads, the method includes the steps of: detecting a message packet containing a destination information and a conversation thread identifying information; determining whether or not a conversation thread corresponding to the conversation thread identifying information contained in the message packet exists in the message processor; and generating a new conversation thread when it is determined that the corresponding conversation thread does not exist in the message processor.

According to a further aspect of this invention, a message processing method is provided for execution by a message processor which is connected to a network and has a conversation thread control part that is capable of generating a plurality of conversation threads, the method includes the steps of: detecting a message packet containing a conversation thread identifying information and a content information; determining whether or not a conversation thread corresponding to the conversation thread identifying information contained in the message packet exist in the message processor, passing a control to the corresponding conversation thread when it is determined that the corresponding conversation thread exists in the message processor; and analyzing the content of the content information.

According to a further aspect of this invention, a message processing method is provided for execution by a message processor which has a plurality of conversation threads and a conversation part object including a conversation thread control part that is capable of controlling the plurality of conversation threads, the message processor being capable of sending a message to another message processor through a network, the method includes the steps of: halting the plurality of conversation threads; sending the conversation part object to another place through the network; and resuming the plurality of conversation threads at the another message processor.

According to a still further aspect of this invention, a message processor is provided which is connected to a network, the processor including: a plurality of conversation threads; an agent communication language manager for detecting a message packet which contains a destination information, a conversation thread identifying information and a content information; a first conversation thread control part for determining whether or not a conversation thread corresponding to the conversation thread identifying information contained in the message packet exists in the message processor; a second conversation thread control part for generating a new conversation thread when it is determined that the corresponding conversation thread does not exist in the message processor; and a protocol manager for converting the message packet to a protocol which corresponds to a network to which the message processor is connected.

According to a still further aspect of this invention, a message processor is provided which is connected to a network, the processor includes: an agent communication language manager for detecting a message packet which contains a conversation thread identifying information; a first conversation thread control part for determining whether or not a conversation thread corresponding to the conversation thread identifying information contained in said message packet exists in said message processor, and a second conversation thread control part for generating a new conversation thread when it is determined that the corresponding conversation thread does not exist in the message processor.

According to a still further aspect of this invention, a message processor is provided which is connected to a network and has a conversation thread control part which is capable of generating a plurality of conversation threads, the processor includes: an agent communication language manager for detecting a message packet which contains a conversation thread identifying information and a content information; a first conversation thread control part for determining whether or not a conversation thread corresponding to the conversation thread identifying information contained in the message packet exists in the message processor; and a second conversation thread control part for passing a control to said corresponding conversation when it is determined that said corresponding conversation thread exists in said message processor.

According to a still further aspect of this invention, a message processor is provided which is connected to a network and has a conversation thread control part which is capable of generating a plurality of conversation threads, the processor includes: a protocol manager for receiving a message packet containing a conversation thread identifying information; a first conversation thread control part for determining whether or not a conversation thread corresponding to the conversation thread identifying information contained in the message packet exists in the message processor; and a second conversation thread control part for generating a new conversation thread when it is determined that the corresponding conversation thread does not exist in the message processor.

According to a still further aspect of this invention, a message processor is provided which is connected to a network and has a conversation thread control part which is capable of generating a plurality of conversation threads, the processor includes: a protocol manager for receiving a message packet containing a conversation thread identifying information and a content information; a first interpreter for determining whether or not a conversation thread corresponding to the conversation thread identifying information contained in the message packet exists in the message processor, and a second interpreter for passing a control to the corresponding conversation thread when it is determined that the corresponding conversation thread exists in the message processor.

According to one of the aspects of this invention, a recording media is provided which stores therein a message processing program for execution by a message processor which is connected to a network and has a conversation thread control part capable of generating a plurality of conversation threads, the message processing program including: a program code which instructs the message processor to detect a message packet containing a destination information and a conversation thread identifying information; a program code which instructs the message processor to determine whether or not a conversation thread corresponding to the conversation thread identifying information contained in the message packet exists in the message processor; a program code which instructs the message processor to generate a new conversation thread when it is determined that the corresponding conversation thread does not exist in the message processor; and a program code which instructs the message processor to send the message packet to a destination which corresponds to the destination information.

According to a further aspect of this invention, a media is provided which stores therein a message processing program for execution by a message processor which has a conversation thread control part capable of generating a plurality of conversation threads and is connected to a network, the message processing program including: a program code which instructs the message processor to detect a message packet containing a destination information, a conversation thread identifying information and a content information; a program code which instructs the message processor to determine whether or not a conversation thread corresponding to the conversation thread identifying information contained in the message packet exist in the message processor; a program code which instructs the message processor to generate a new conversation thread when it is determined that the corresponding conversation thread does not exist in the message processor; a program code which instructs the message processor to convert the message packet to a protocol which corresponds to which the message processor is connected; and a program code which instructs the message processor to send the message packet to the destination which corresponds to the destination information.

According to a further aspect of this invention, a media is provided which stores therein a message processing program for execution by a message processor which has a conversation thread control part capable of generating a plurality of conversation threads and is connected to a network, the message processing program including: a program code which instructs the message processor to detect a message packet containing a conversation thread identifying information; a program code which instructs the message processor to determine whether or not a conversation thread corresponding to the conversation thread identifying information contained in the message packet exist in the message processor; and a program code which instructs the message processor to generate a new conversation thread when it is determined that the corresponding conversation thread does not exist in the message processor.

According to a further aspect of this invention, a media is provided which stores therein a message processing program for execution by a message processor which has a conversation thread control part capable of generating a plurality of conversation threads and is connected to a network, the message processing program including: a program code which instructs the message processor to detect a message packet containing a conversation thread identifying information and a content information; a program code which instructs the message processor to determine whether or not a conversation thread corresponding to a conversation thread identifying information contained in the message packet exists in the message processor; and a program code which instructs the message processor to pass a control to the corresponding conversation thread when it is determined that the corresponding conversation thread exists in the message processor.

According to a further aspect of this invention, a media is provided which stores therein a message processing program for execution by a message processor which has a conversation thread control part capable of generating a plurality of conversation threads and is connected to a network, the message processing program including: a program code which instructs the message processor to detect a message packet containing conversation thread identifying information; a program code which instructs the message processor to determine whether or not a conversation thread corresponding to a conversation thread identifying information contained in the message packet exists in the message processor; and a program code which instructs the message processor to generate a new conversation thread when it is determined that the corresponding conversation thread does not exists in the message processor.

According to a further aspect of this invention, a media is provided which stores therein a message processing program for execution by a message processor which has a conversation thread control part capable of generating a plurality of conversation threads and is connected to a network, the message processing program including: a program code which instructs the message processor to detect a message packet containing conversation thread identifying information and content information; a program code which instructs the message processor to determine whether or not a conversation thread corresponding to the conversation thread identifying information contained in the message packet exists in the message processor; a program code which instructs the message processor to pass a control to the corresponding conversation thread when it is determined that the corresponding conversation thread exists in the message processor; and a program code which instructs the message processor analyze the content of the content information.

According to a further aspect of this invention, a media is provided which stores therein a message processing program for execution by a message processor which has a conversation thread control part capable of generating a plurality of conversation threads and is capable of sending a message to another message processor through a network, is the message processing program including: a program code which instructs the message processor to halt the plurality of conversation threads; a program code which instructs the message processor to send the conversation part object to another place through the network; and a program code which instructs the message processor to resume the plurality of conversation threads.

According to a still further aspect of this invention, a media is provided which stores therein a plurality of objects to be loaded to a message processor which has a conversation thread control part capable of generating a plurality of conversation threads and is connected to a network, the message processing program including: a plurality of conversation threads; an agent communication language manager for detecting a message packet which contains a destination information, conversation thread identifying information and content information; a first conversation thread control part for determining whether or not a conversation thread corresponding to the conversation thread identifying information contained ins aid message packet exists in the message processor; and a second conversation thread control part for generating a new conversation thread when it is determined that the corresponding conversation thread does not exist in the message processor; and a protocol manager for converting the message packet to a protocol which corresponds to a network to which the message processor is connected.

According to a still further aspect of this invention, a media is provided which stores therein a plurality of objects to be loaded to a message processor which has a conversation thread control part capable of generating a plurality of conversation threads and is connected to a network, the message processing program including: an agent communication language manager for detecting a message packet which contains conversation thread identifying information; a first conversation thread control part for determining whether or not a conversation thread corresponding to the conversation thread identifying information contained in the message packet exists in the message processor; and a second conversation thread control part for generating a new conversation thread when it is determined that the corresponding conversation thread does not exist in the message processor.

According to a still further aspect of this invention, a media is provided which stores therein a plurality of objects to be loaded to a message processor which has a conversation thread control part capable of generating a plurality of conversation threads and is connected to a network, the message processing program including: an agent communication language manager for detecting a message packet which contains conversation thread identifying information and content information; a first conversation thread control part for determining whether or not a conversation thread corresponding to the conversation thread identifying information contained in the message packet exists in the message processor; and a second conversation thread control part for passing a control to the corresponding conversation when it is determined that the corresponding conversation thread exists in the message processor.

According to a still further aspect of this invention, a media is provides which stores therein a plurality of objects to be loaded to a message processor which has a conversation thread control part capable of generating a plurality of conversation threads and is connected to a network, the message processing program including: a protocol manager for receiving a message packet containing a conversation thread identifying information; a first conversation thread control part for determining whether or not a conversation thread corresponding to the conversation thread identifying information contained in the message packet exists in the message processor; and a second conversation thread control part for generating a new conversation thread when it is determined that the corresponding conversation thread does not exist in the message processor.

BRIEF DESCRIPTION OF THE DRAWINGS

The above set forth and other features of the invention are made more apparent in the ensuing Detailed Description of the Invention when read in conjunction with the attached Drawings, wherein:

FIG. 7 schematically shows a conversation content monitoring part control table in a preferred embodiment of this invention;

FIG. 10 schematically shows an interpreter control table in a preferred embodiment of this invention;

FIG. 11 schematically shows a translator control table in a preferred embodiment of this invention;

Identically labeled elements appearing in different ones of the above described figures refer to the same elements but may not be referenced in the description for all figures.

DETAILED DESCRIPTION OF THE INVENTION

Figure 1:
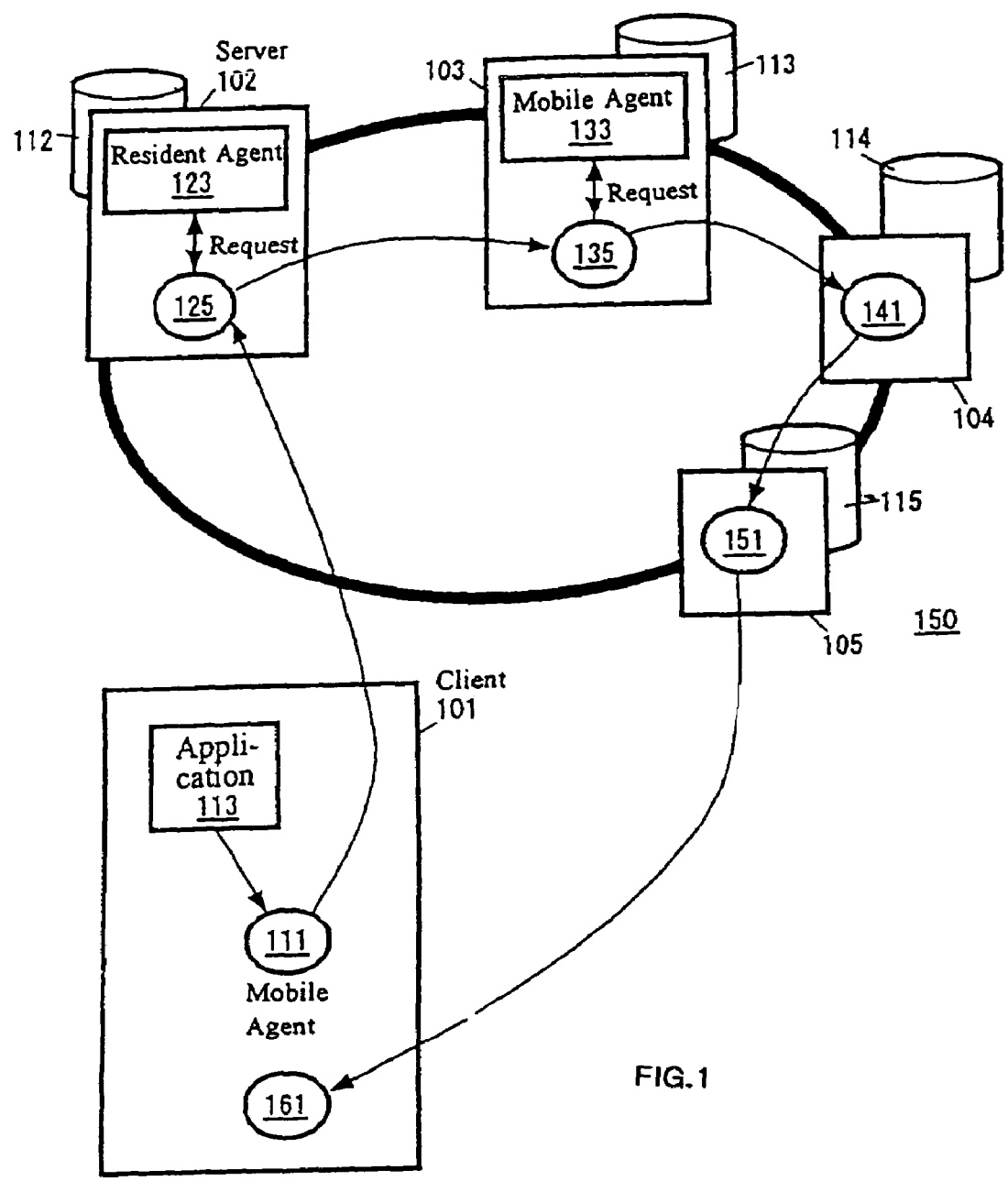
FIG. 1 shows a distributed network environment in which a mobile agent of this invention operates.

The embodiment of this invention will now be described with reference to the drawings. With reference to FIG. 1, a distributed network environment 150 is shown which executes mobile objects of this invention. Each server 112-115 is provided with a place 102-105 for serving mobile agents 125, 135, 141, 151 and 161. The group of places in the distributed network environment 150 is referred to as a crowd.

An application 113 for forming and moving a mobile agent, for example mobile agent 111, is defined in a client system 101. Mobile agents, such as mobile agent 125, are sent out by the application 113 and may contact other agents (mobile or resident agents) existing in each place 102-105, send a request, and receive a result of a request. An agent which contacts a mobile agent to provide a service is hereinafter referred to as an actor agent. A place provides a support to the contact between agents. Mobile agents, such as mobile agent 125, may hold a result of a request received from an actor agent, continue to move, or send the result to the client 101 or another place during movement.

The mobile agent 125 (or a resident agent) may send a message packet to another place and execute a conversation and an instruction in the another place.

Figure 2:
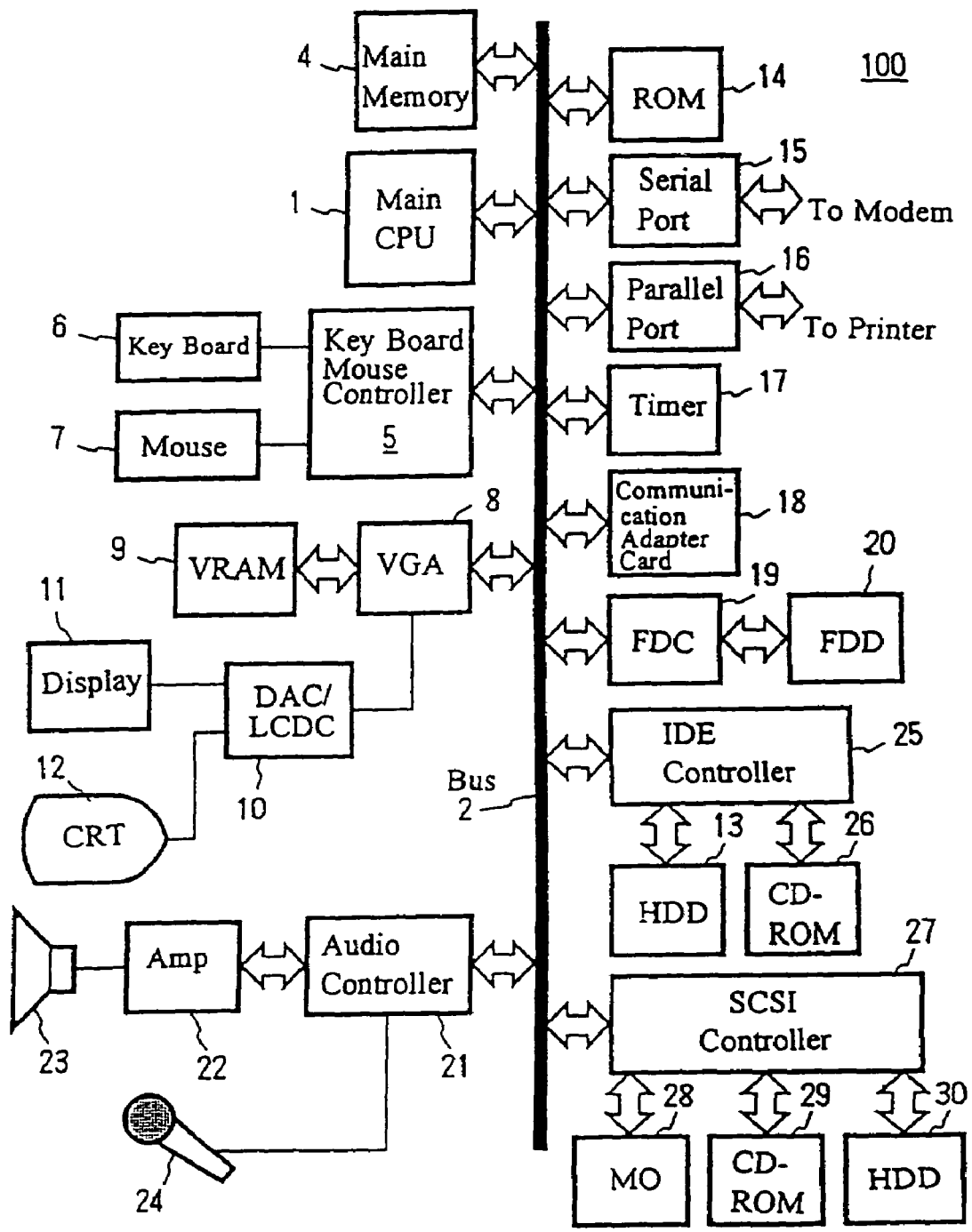
FIG. 2 is a block diagram showing one embodiment of a hardware configuration of a client system or a server system of this invention.

FIG. 2 schematically shows a hardware configuration of each node (a server or a client site) existing on the distributed network environment 150 shown in FIG. 1. Each node 100 has a main central processing unit (CPU) 1 and a main memory 4. The main CPU 1 and the main memory 4 are connected to hard disk drives 13 and 30, which act as auxiliary storage devices, via a bus 2. Storage media drives including a floppy disk drive (FDD) 20, the hard disk drives (HDD) 13 and 30, CD-ROM drives 26 and 29, and a MO drive 28, are connected to the bus 2 through controllers including, for example, a floppy disk controller (FDC) 19, an IDE controller 25 and a small computer system interface (SCSI) controller 27.

A portable storage media such as a floppy disk is inserted in to the storage media drive such as the floppy disk drive 20. The floppy disk or other storage media of the hard disk drive 13 and a ROM 14 have recorded therein a computer program which provides instructions to the CPU 1 in cooperation with an operating system (OS) to practice this invention. During operation, the program is loaded into the memory 4 for execution. The computer software may be compressed or divided into multiple pieces for storage in multiple media.

The node system 100 may be a system which has a user interface hardwired, such as a pointing device (e.g., a mouse 7 or a joy stick, etc.) or a keyboard 6 for input and a display (e.g., a CRT 12) for presenting visual data to a user. A parallel port 16 may be provided for connecting an external output device such as a printer. The node system 100 may have a modem connected thereto via a serial port 15 for connection to the network through the serial port 15 and the modem or through a token ring or a communication adapter 18 to communicate with other computer systems.

It can be appreciated that this invention may be implemented in a conventional personal computer (PC), a workstation, a general purpose computer or a combination of them. It should be noted, however, that these components are chosen as exemplary components and that not all components are necessarily an indispensable component of the invention.

For example, it is not necessary to install a user interface in the server side because it is sufficient to have a basic data processing function such as a CPU and a memory, and a communication function. It is also sufficient for the client side to have a configuration that is needed to send out a message packet (described later), including a communication function and an input means for designating a message packet and instructions to send out the message packet. Further, when a machine is controlled remotely from a portable terminal, it would be enough to have a data processing function and a communication function to receive an instruction to send the message packet from the portable terminal, detect it and send out the message packet.

The operating system (OS) in the client side and the server side may be implemented as one which supports on a standard basis, a GUI multi-windows environment such as WindowsNT (trademark of Microsoft), Windows95 (trademark of Microsoft), Windows3.x (trademark of Microsoft), OS/2 (trademark of IBM), X-Window system (trademark of MIT) on AIX (trademark of IBM), and Solariz (trademark of Sun Micro Systems). The OS may also be implemented to support a character based environment such as PC-DOS (trademark of IBM) and MS-DOS (trademark of Microsoft), or a real time OS such as OS/Open (trademark of IBM) and Vxworks (trademark of Wind River Systems, Inc.) without being limited to any specific operating system environment.

Figure 3:
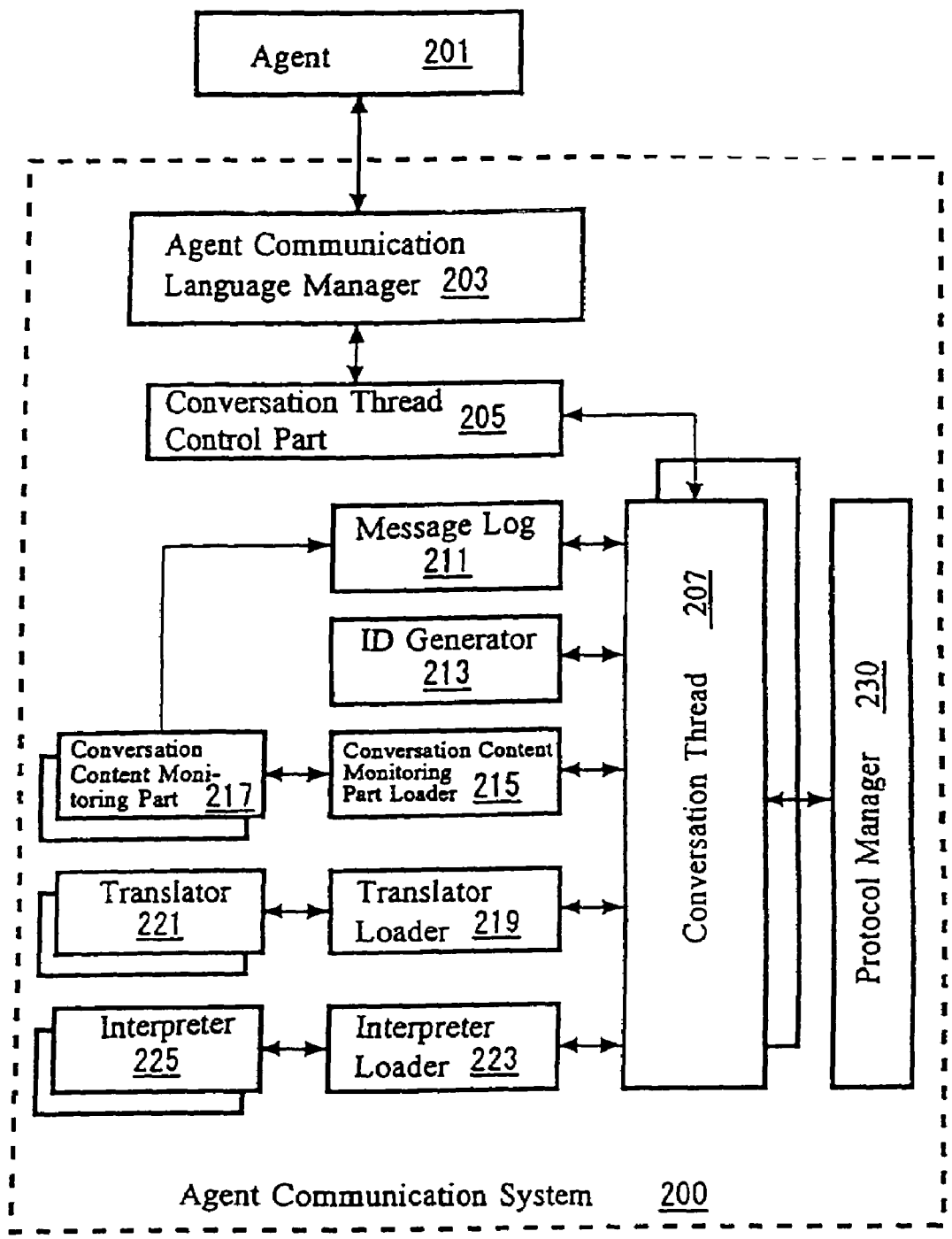
FIG. 3 is a block diagram of one embodiment of processing components in the client site or the server site of this invention.

With reference to the block diagram in FIG. 3, a system configuration of the server side in the preferred embodiment of this invention is described.

An agent 201 is either a mobile agent which was sent to this server or a resident agent which is resident in this server. The agent 201 may have a dialog with the agent communication system 200 by sending out or receiving a message packet which will be described later. An agent communication language manager 203 is a component for receiving a message sent from the agent 201 or the existing system and network, and for transmitting messages to these systems.

A conversation thread control part 205 is a component for controlling a conversation thread 207 that corresponds to each conversation with an agent, for example agent 201, for forming a suitable thread in conformance to the flow of conversation, or for giving the control to the thread which has been generated. Multiple conversations are split into multi-threads to accept multiple conversations asynchronously. The thread is referred to as a conversation thread. According to one aspect of this invention, a plurality of such conversation threads are generated by which conversations are held in parallel and asynchronously with a plurality of agents.

A message log 211 is a component for memorizing conversations. A conversation content monitoring part 217 is a component which conducts a policy check as to whether or not a conversation is valid from a conversation log stored in the message log and the content of the current message. A conversation content monitoring part loader 215 is a component for calling the conversation monitoring part 217 which corresponds to the message type of the message packet 300.

A translator 221 is a component for translating the agent communication language used in the conversation into another language. A translator loader 219 is a component for controlling a group of translators.

An interpreter 225 is a component for understanding and executing the content of a conversation. A plurality of different such interpreters are provided corresponding to ontologies and describing languages which will be described later. The interpreters each have a format check routine, a content interpretation routine and an execution routine, each of which is specific to an ontology. Take, for example, an ontology of traffic reservation. Assuming that a content "R, flight, Narita to Tacoma, 1997/07/06/15:00-1997/07/06/1800" is received. This content is checked in accordance with a predetermined format, and a specific content interpretation routine is executed. The interpretation routine interprets that "R" is a command which instructs the routine to make a reservation by accessing a database in a given airline to execute an execution routine for checking the reservation status. A reservation is made for a non-smoking seat, economy, FlightXX26 for Tacoma, Seattle, departing Narita airport at 15:00 on Jul. 6, 1997 and the reservation is confirmed to the sender.

An interpreter loader 223 is a component for controlling a group of interpreters 225. A protocol manager 230 is a component for converting to a protocol which conforms to the type of network to be connected.

Each of functional blocks in FIG. 3 has been described. These functional blocks (components), which are logical functional blocks, are not meant to be implemented as an independent integral hardware or software and may be implemented as a complex of hardware devices and software routines, or common hardware devices and software routines. Further, not all of the functional blocks in FIG. 3 are necessarily a component which is indispensable to this invention.

For example, it would be enough to install interpretation execution parts such as the conversation content monitoring part 217, the translator 221 and the interpreter 225 because this invention provides an agent with a special function to have a conversation with other agents or an existing system. Components such as the conversation content monitoring part loader 215, the translator loader 219, and the interpreter loader 223 may optionally be included or excluded within a given configuration. In one aspect of this invention, because one or more specific number of conversation threads are provided to converse with a specific agent, thread control part 205, message log 211 and ID generator 213 are not an indispensable components.

Figure 4:
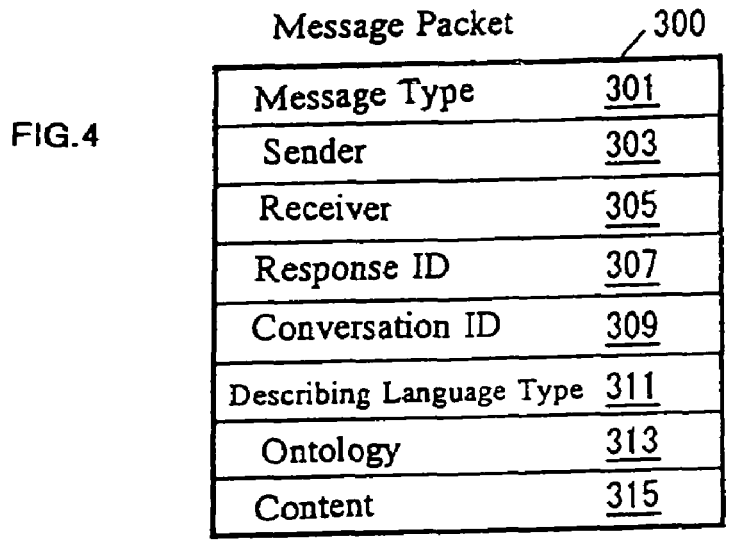
FIG. 4 schematically shows an example of a message packet of this invention.
Figure 5:
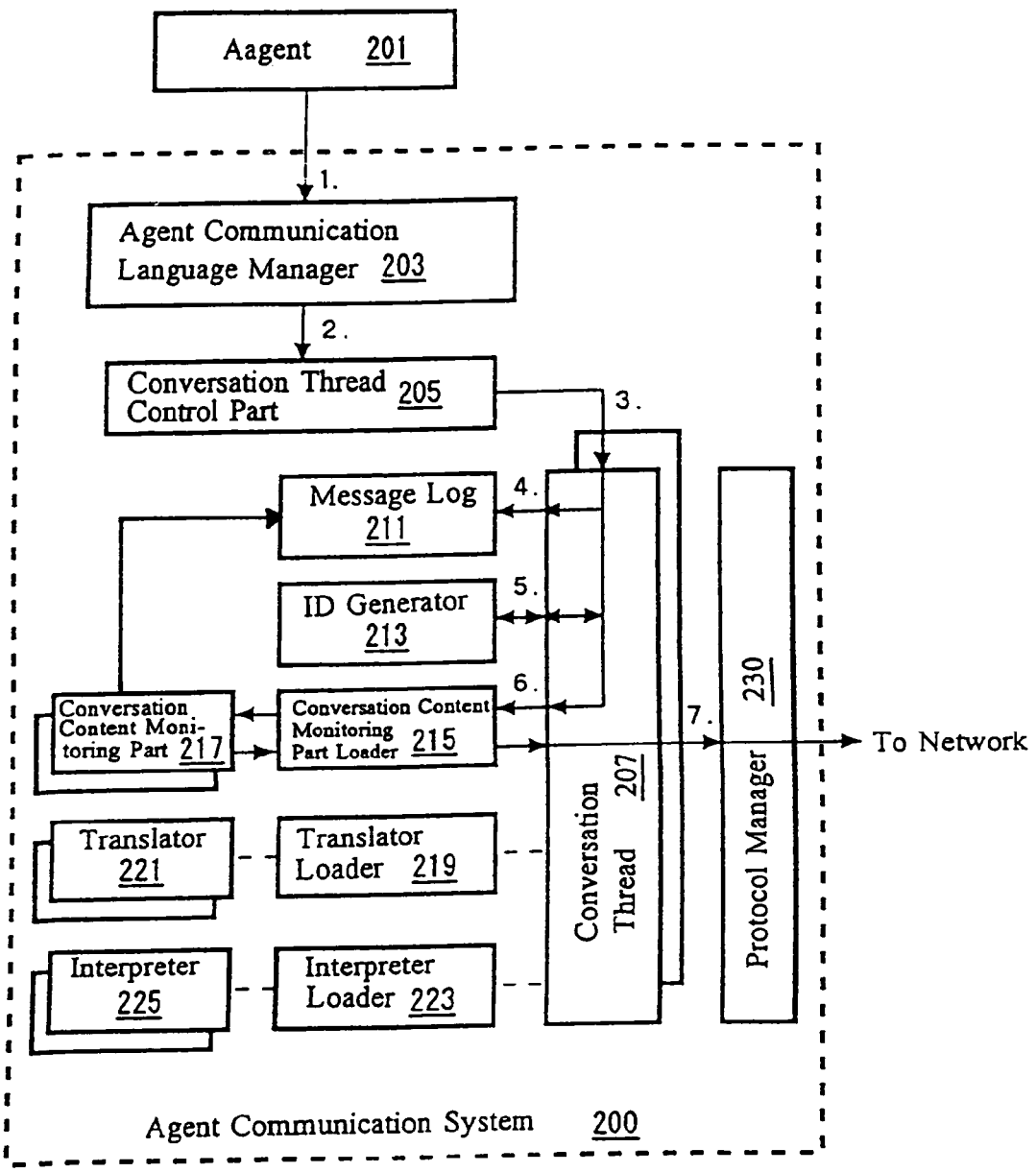
FIG. 5 is a block diagram of one embodiment of processing components in the client (or server) site of this invention.

FIG. 4 schematically illustrates a message packet 300 as used in a preferred embodiment of this invention. FIG. 5 shows an operational condition of each component in FIG. 3 when a message is generated.

In a message type 301 contained in the message packet 300 in FIG. 4, a performative of the agent communication language (ACL) is used in the preferred embodiment of this invention. The ACL is a high level language which provides for communication among agents in a form that is similar to human language, and includes, for example, one provided by FIPA (Foundation for Intelligent Physical Agents), KQML (Knowledge Query Manipulation Language), and KIF (Knowledge Interchange Format). These ACLs are discussed in "SEMANTICS FOR AN AGENT COMMUNICATION LANGUAGE" by Yannis Labrou, A Doctoral Dissertation for the PhD Defense Examination, submitted to the PhD Defense Committee at the Computer Science and Electrical Engineering Department (CSEE) of the University of Maryland Graduate School, and "TR CS-97-03, A Proposal for a new KQML Specification, by Yannis Labrou and Tim Finin, Feb. 3, 1997".

Included in the performative of KQML which is one of the ACLs are;

ask-if, ask-all, stream-all, eos, tell, untell, deny, insert, uninsert, delete-one, delete-all, undelete, achieve, unachieve, advertise, unadvertise, subscribe, error, sorry, standby, ready, next, rest, discard, register, unregister, forward, broadcast, transport-address, broker-one, broker-all, recommend-one, recommend-all, recruit-one, recruit all.

Referring again to FIG. 4, a sender 303 is a sender of a message, while a receiver 305 is a receiver of a message.

A response ID 307 is an ID which follows a preceding conversation. When an agent has a conversation with a plurality of parties, a plurality of response ID's are allocated corresponding to the conversation threads. This will be described in further details below.

A conversation ID 309 is an ID which tells the conversation partner to respond with this ID. The describing language type 311 is information which specifies the language describing a content. The ontology 313 is information which specifies the ontology that the content specifies. In the preferred embodiment of this invention, a ticket purchase ontology, a numerical calculation ontology and a yellow page ontology, etc., are provided.

The content 315 is the particular subjects or topics covered in a message and contains, in the preferred embodiment of this invention, a software routine for forming instructions after it has moved to another place. The content 315 may also internally contain a message packet for movement to another place via a relaying paint.

If the content 315 does contain a message packet for movement, then a "From" entry and a "To" entry are provided to indicate a true sender and a final receiver, respectively.

Figure 6:
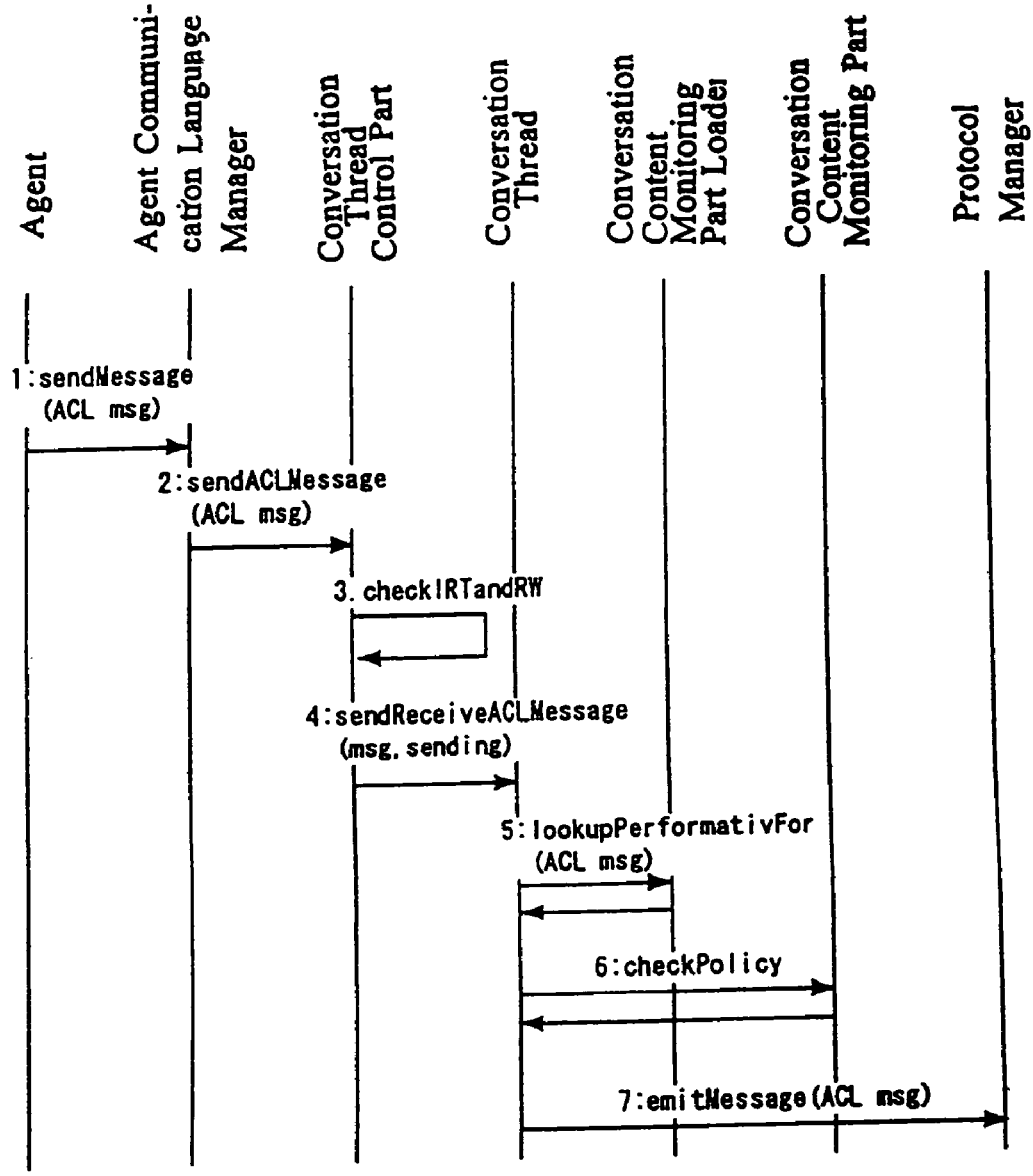
FIG. 6 is an object interaction diagram among the components in a preferred embodiment of this invention.

An operational condition of each component in FIG. 3 during message generation will now be described with reference to FIG. 5. The agent 201 sends a message packet 300 (shown in FIG. 4) to the agent communication system 200. In the preferred embodiment of this invention, the components shown in FIG. 3 are defined as a class of an object oriented programming language. Each object, upon generating a message, prompts other objects to operate by sending an instruction to such other objects. These prompts between components is shown in the object instruction diagram of FIG. 6.

The agent communication language manager 203, upon receiving the message packet 300, determines that the message packet 300 is one for generating a conversation depending on whether it is called by a "sendMessage" or a "handleMessage" method and instructs the conversation thread control part 205 to process. The conversation thread control part 205 determines whether or not to instruct an already generated conversation thread 207, to process with reference to the response ID 307 which is contained in the message packet 300. If the conversation thread control part 205 determines that it is a new conversation, it generates a new conversation thread 207, instructs the generator 213 via the new conversation thread 207 to allocate a new conversation ID 309 to the new conversation thread 207, and moves control to the new conversation thread 207.

In this invention, because the conversation threads are dynamically generated in this way, conversations can be held in parallel and asynchronously with other system (agents or existing system). In the preferred embodiment of this invention, the response ID 307 is allocated with an ID that is uniquely identified on the network such as, for example, "URL+Date+Time+Serial Number".

If a conversation thread 207 corresponding to the response ID 307 has existed, the conversation thread control part 205 determines that this is not a new conversation and moves control to the corresponding and existing conversation thread 207. If it is desired to continue conversation, the conversation thread 207 instructs the ID generator 213 to allocate a conversation ID 309.

The message log 211 memorizes the message packet 300 which is sent to the conversation thread 207. The conversation content monitoring part loader 215 calls a conversation content monitoring part 217 corresponding to the message type 301 of the message packet 300. The conversation content monitoring part 217 corresponding to the message type 301 may be called by providing a conversation content monitoring part table 330 as shown in FIG. 7, or by using a class name of the conversation content monitoring part 217 which is the same as the message type 301.

The conversation content monitoring part 217 conducts a policy check as to whether or not a conversation is valid based on the conversation log stored in the message log 211 and the content of the current message. For example, if the message type 301 of the received message packet 300 is a value "sorry" (a message type which means that the content of the conversation is understandable but that the receiving part does not have a capability to process), a reference is made to the message log 211 for a message type 301 of the message which has a corresponding response ID 307 and an immediately preceding ID. It is then determined that the message type 301 is of no problem if it is of a type which can be valid as a conversation, for example "ask-if" a message type which queries about the processing capability of the other party. If it is determined that the message type 301 is in error, for example, if it is determined to be of a message type 301 can not be valid (e.g., the conversation "sorry"), then the message type 301 is found to be in error (not valid) and an action is taken such as sending a message packet of "error" (a message type 301 which means an error) to the sender 303 of the message packet 300.

If it is determined that a conversation can be valid, a message packet 300 is sent from the conversation thread 207 to a node which is designated as a receiver 303 through the protocol manager 230. The protocol manager 230 converts the protocol to one which conforms to the type of the network to be connected so that the agent communication system 200 can send and receive a message packet 300 without being aware of the network protocol.

Figure 8:
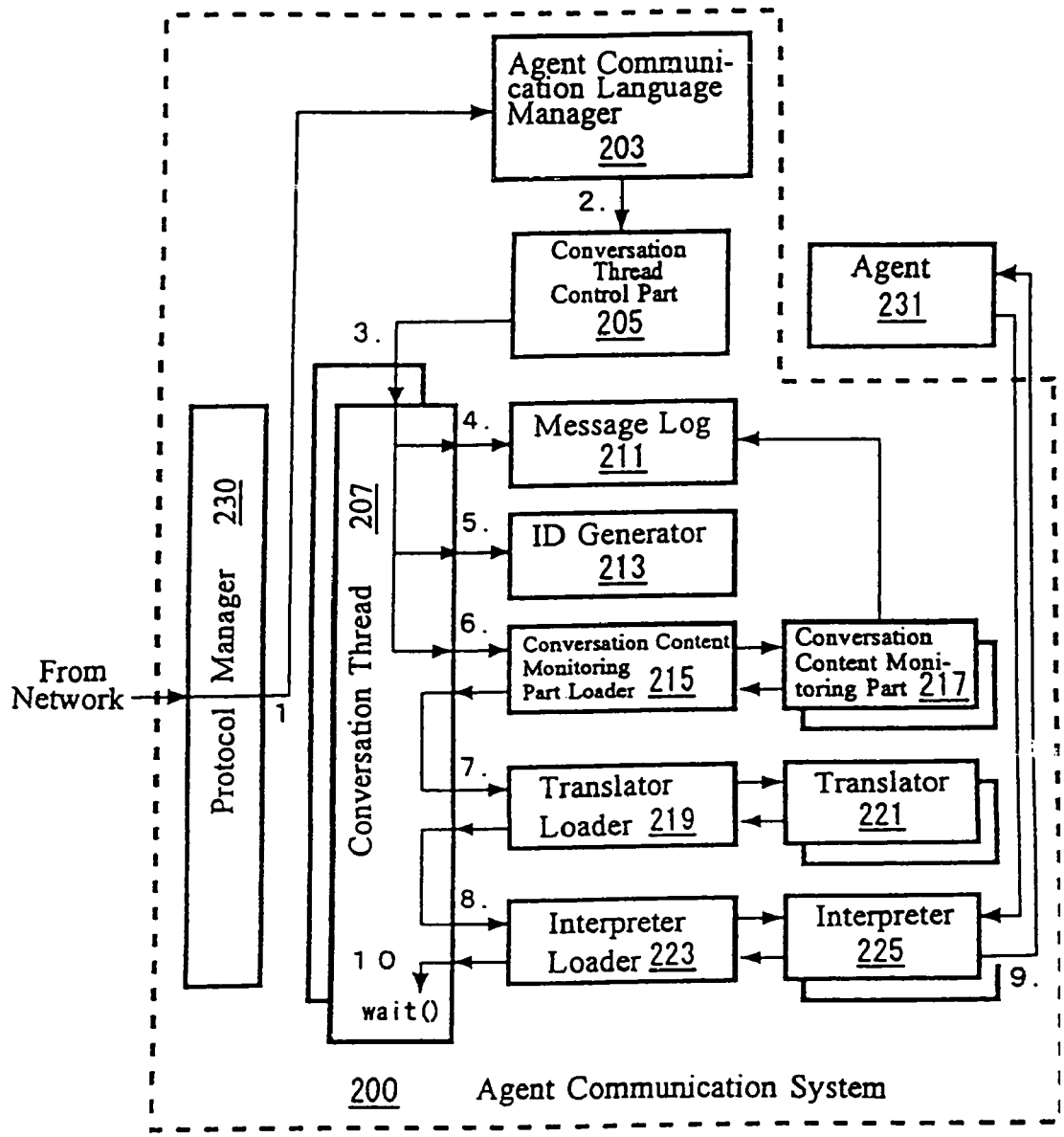
FIG. 8 is a block diagram of one embodiment of processing components in the server (or client) site of this invention.
Figure 9:
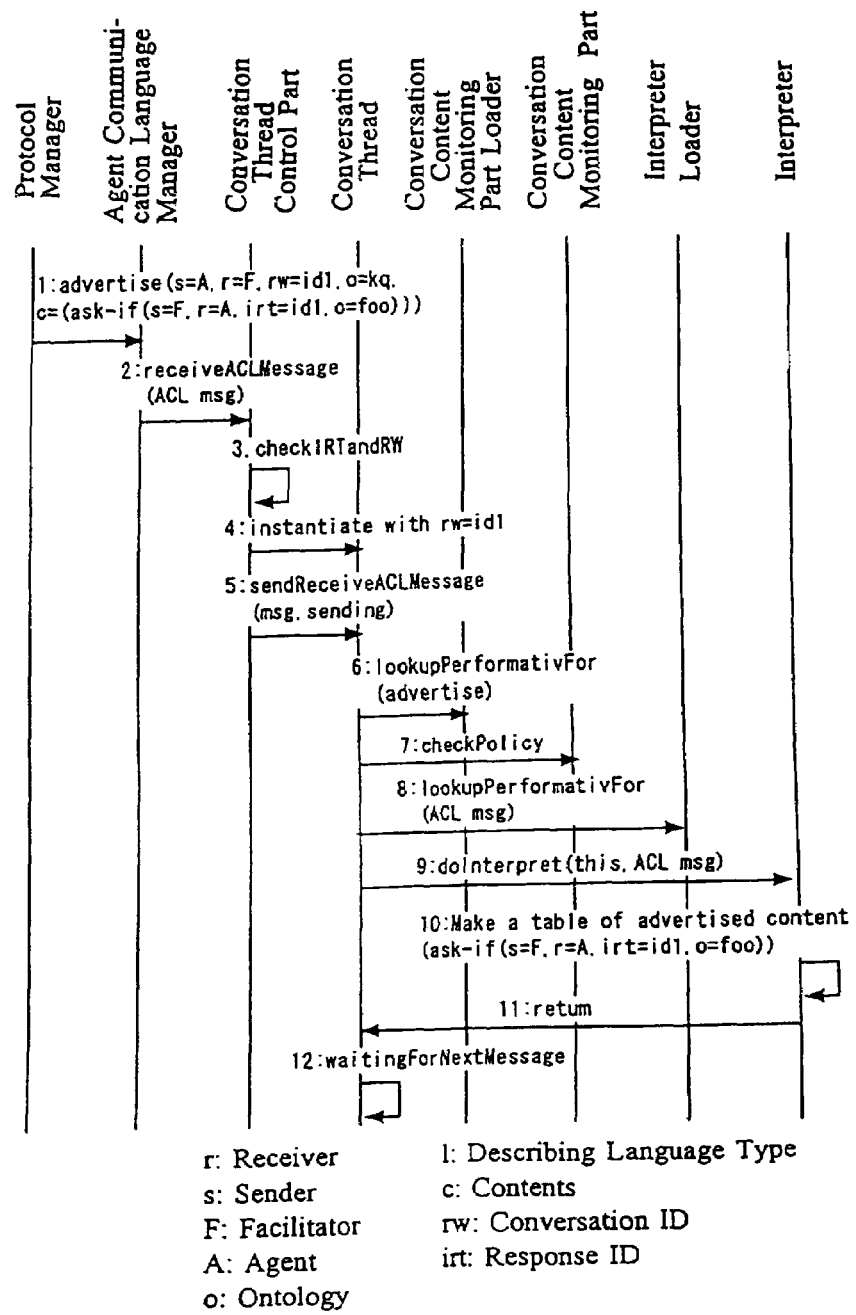
FIG. 9 is an object interaction diagram among the components in a preferred embodiment of this invention.

Now with reference to FIG. 8 and FIG. 9, operational conditions of each component at the node which received the message packet so sent is described.

The agent communication language manager 203 which has received a message packet 300 from the protocol manager 230 determines that the received message packet 300 is one for receiving a message as it is called with the "handleMessage" method and asks the conversation thread control part 205 to handle it. In the preferred embodiment of this invention, the protocol manager 230 knows the existence of the agent communication language manager 203 as the latter internally instantiates, it can send the incoming data to the agent communication language manager 203.

The conversation thread control part 205 determines whether or not to ask the conversation thread 207 to process the message packet 300 with reference to the response ID 307 contained in the message packet 300 if the conversation thread control part 205 determines that the packet 300 is a new conversation, it generates a new conversation thread 207 and transfers the packet 300 to the conversation thread 207 for processing.

When a conversation thread 207 corresponding to the response ID 307 has existed, the conversation thread control part 205 determines that the packet is not a new conversation part and transfers it to the corresponding, existing conversation thread 207 for processing. The message log 211 memorizes a message packet 300 which is sent to the conversation thread 207.

The conversation content monitoring part loader 215 calls a conversation content monitoring part 217 which conforms to the message type 301 of the message packet 300. The conversation content monitoring part 217 conducts a policy check as to whether or not a conversation is valid based upon the conversation log stored in the message log 211 and the content 315 of the current message. If it is determined that a conversation is valid, the conversation thread 207 transfers control to the interpreter loader 223 for processing. The interpreter loader 223 understands the agent communication language of the message packet 300 and determines whether or not the describing language type 311 contained in the message packet 300 and an interpreter 225 which corresponds to the ontology 313 are stored in an interpreter control table 350 shown in FIG. 10.

If the interpreter 225, which corresponds to the agent communication language, describing language type 311 and the ontology 313 of the received massage packet 300 is stored in the interpreter control table 350, the content 315 is interpreted by that interpreter 225. If an interpreter 225 which corresponds to the agent communication language, describing language type 311 and the ontology 313 of the received massage packet 300 is not stored in the interpreter control table 350, a determination is made as to whether or not an interpreter 225 which corresponds to that combination exists in the interpreter library which is managed (accessible) by the system.

If the interpreter 225 exists, it is registered in the interpreter control table 350 and the content 315 is interpreted by using that interpreter 225. If an interpreter 225 which corresponds to a combination of the agent communication language, describing language type 311 and the ontology 313 does not exist in the interpreter library, determination is made as to whether or not an interpreter 225 which corresponds to a combination of the describing language type 311 and the ontology 313 exists in the interpreter library. If it does not exist, it is determined that the message can not be processed. In the preferred embodiment of this invention, the onotologies are hierarchically structured so that an interpreter 225 of a best matching ontology is used.

If the interpreter 225 exists, the control is transferred to the translator loader 219 to translate the content 315 into the agent communication language of the discovered interpreter 225. The translator loader 219 makes a reference to the translator control table 340 and determines whether or not there exists a translator which can execute the requested translation. In the preferred embodiment of this invention, if the translator does not exist, the translator library is searched in the way as the interpreter library was searched, an entry is made to the table 340 and the translated content 315 is processed by the selected interpreter 225. If the translator 225 does not exist, it is determined that the message can not be processed.

In the preferred embodiment of this invention, the result of the interpretation by the interpreter 225 is transmitted to the agent 231 where it is processed according to the content of instructions which are described in the content 315. Depending on what is in the content 315, either the conversation thread 207 is destroyed, a process is entered to begin a new message generation, or a new agent is generated. In the preferred embodiment of this invention, the interpreter 225 returns the control to the conversation thread 207. The conversation thread 207 will standby until another message is received.

In contrast to many API calls in a prior art procedural system, a conversation is asynchronous so that it is unpredictable when the receiving party replies in response to a conversation sent from a sending party to the receiving party. It is possible that information which is possessed by the receiving party could be returned at a timing which is changed by an external force (such as an action by other agents). The reply is sent as a message packet in such case too. The conversation thread 207 waits with a "wait0" method until a reply following the conversation is returned. The "wait0" method renders the conversation thread 207 in wait state and waits until it is woken up by a function (method) like "notify0" or others. When the reply is returned, the message is given to the agent system 200. If it is found that the message is a message following the existing conversation, the thread of sleeping conversation is woken up and given the message.

In the preferred embodiment of this invention, when the agent 231 started a conversation in the past and is waiting for a reply, that conversation was started through the agent communication system 200 (sending the "sendmessage" method to the agent communication system) and an object "Conversation" is returned as a return value of the "sendMessage" method. The object "Conversation" is associated with an object called "Result" which holds a state. In the preferred embodiment of this invention, the agent 231 can receive a notification by examining the state which is held by the object "Result" through a polling.

In the preferred embodiment of this invention, in order to provide the agent 201 with the agent communication system 200 which is a conversation part of this invention, a coding in JDK (Java Development Kit: Trademark of Sun Microsystems) is used.

The agent communication 200 of this invention can be provided to the agent 201 simply by instantiating an ACLManager by;
aclManager=new aclManager (agentName, protocolName, port);
To start a conversation, a "kqml" object is prepared for example, and the conversation is started simply by;
Conversation Thread conv=(Conversation Thread) aclManager.sendMessage (kqml);
When waiting for a reply, a polling is conducted by;
Result res=conversation.getResult 0;if (res.isAvailable0) {do something appropriate}

The reply returned or a content of the message sent by another agent is correctly interpreted and executed by an interpreter of the default agent communication system 200.

In the preferred embodiment of this invention described above, the interpretation execution parts are registered in the control tables at the time of execution. However, the interpretation execution parts need not be registered at the time of execution and, instead, a check may be made as to what interpretation execution parts exist to form and maintain an interpretation execution part control table.

Figure 14:
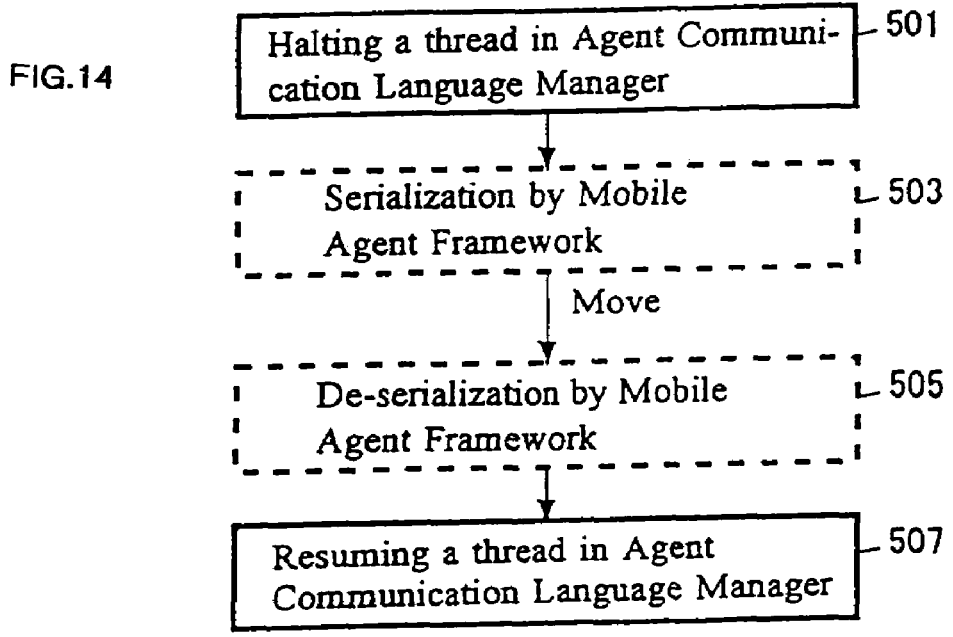
FIG. 14 is a flow chart showing an embodiment of processing steps taken when an agent communication system of this invention is moved over the network.
Figure 12:
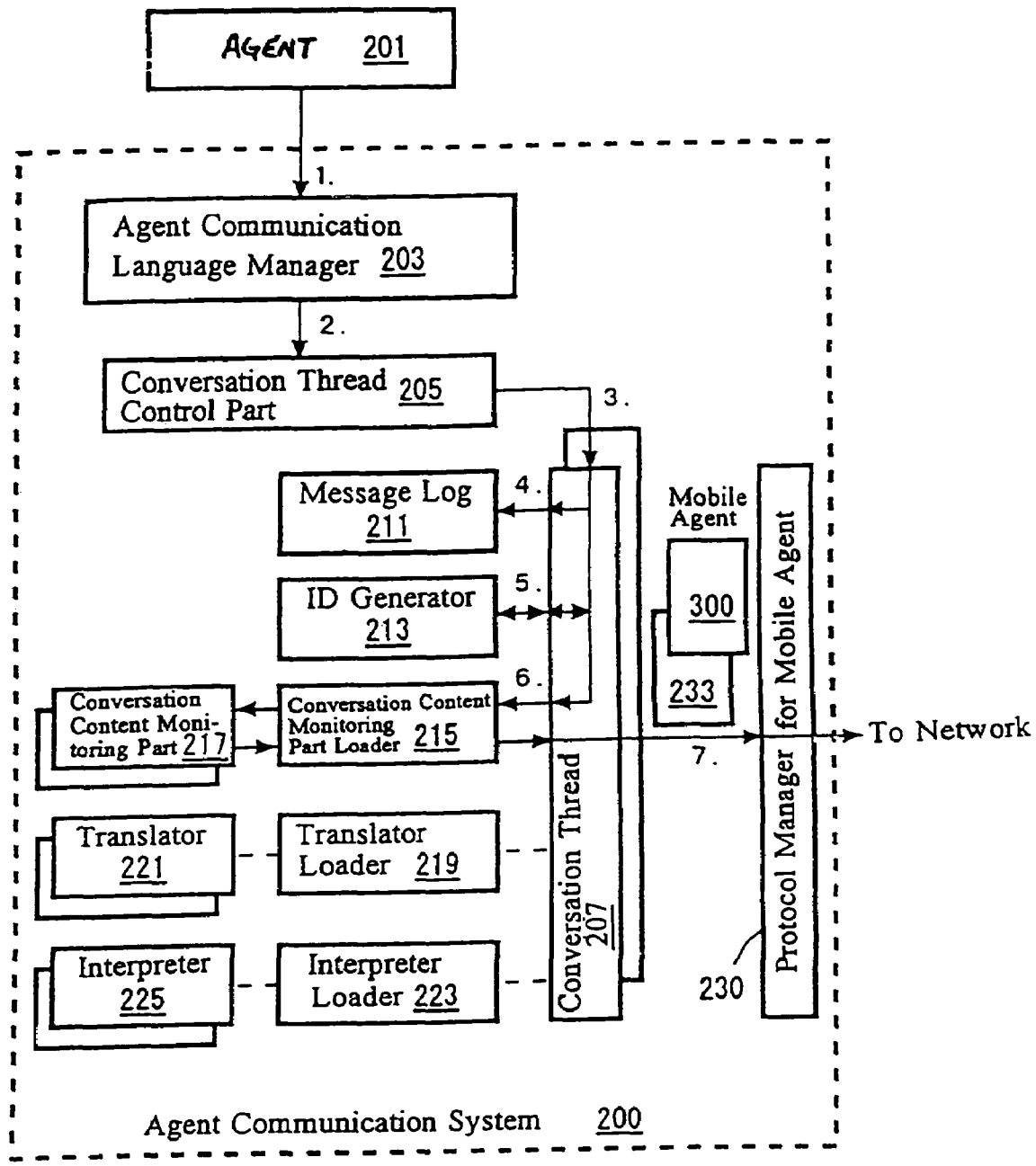
FIG. 12 is a block diagram of one embodiment of processing components in the client (or server) site of this invention.
Figure 13:
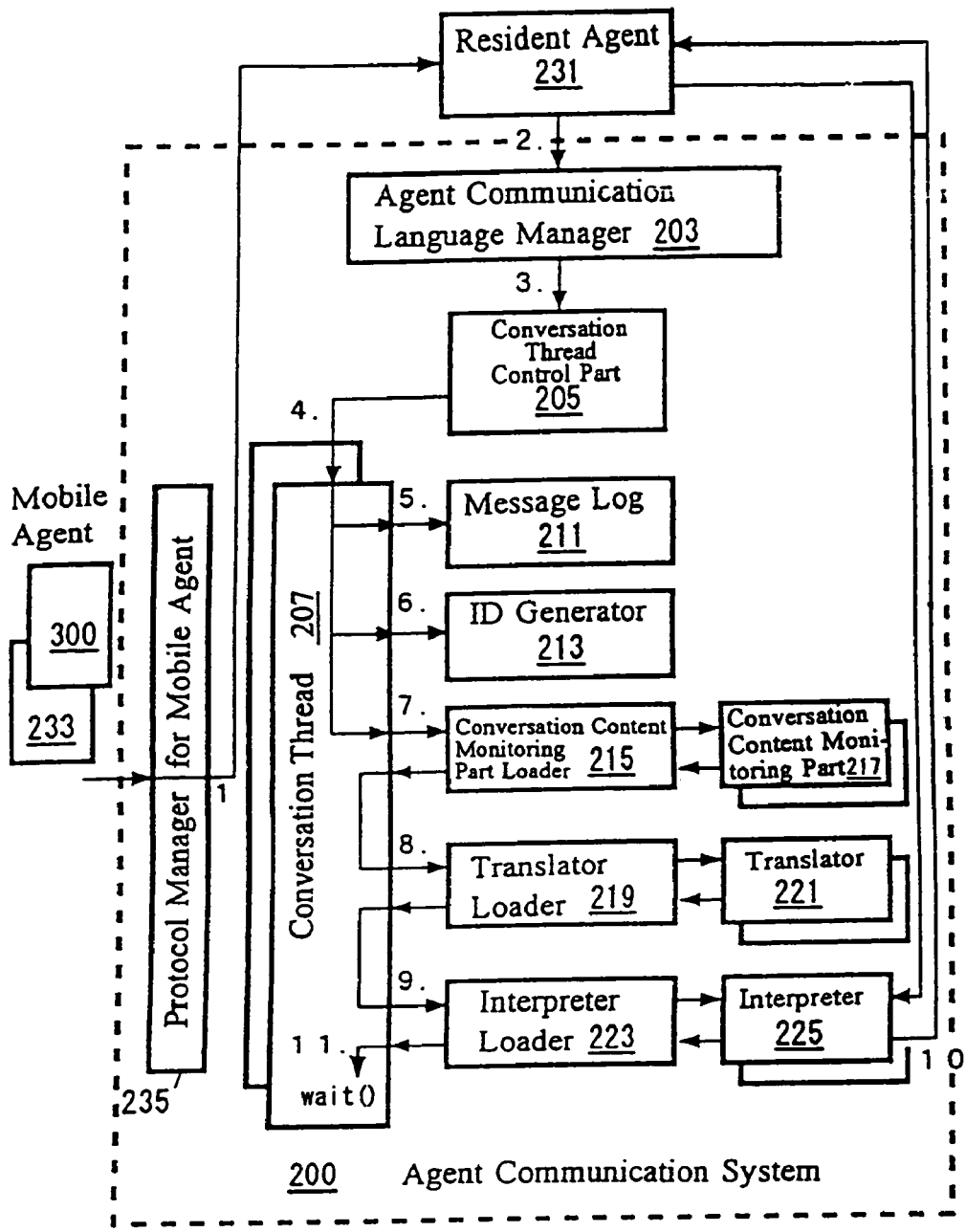
FIG. 13 is a block diagram of one embodiment of processing components in the server (or client) site of this invention.

While the message packet 300 moves among nodes in the preferred embodiment of this invention, the message packet 300 may be sent in an attachment to a mobile agent 233 (as shown in FIGS. 12 and 13). In such a case, the mobile agent 233 moves around places and holds conversations with the message packet 300 attached thereto. It is further possible to carry out complex jobs such as having a conversation at another place using the process result. The movement of the mobile agent over the network is accomplished, for example, by executing the steps shown in FIG. 14.

Figure 15:
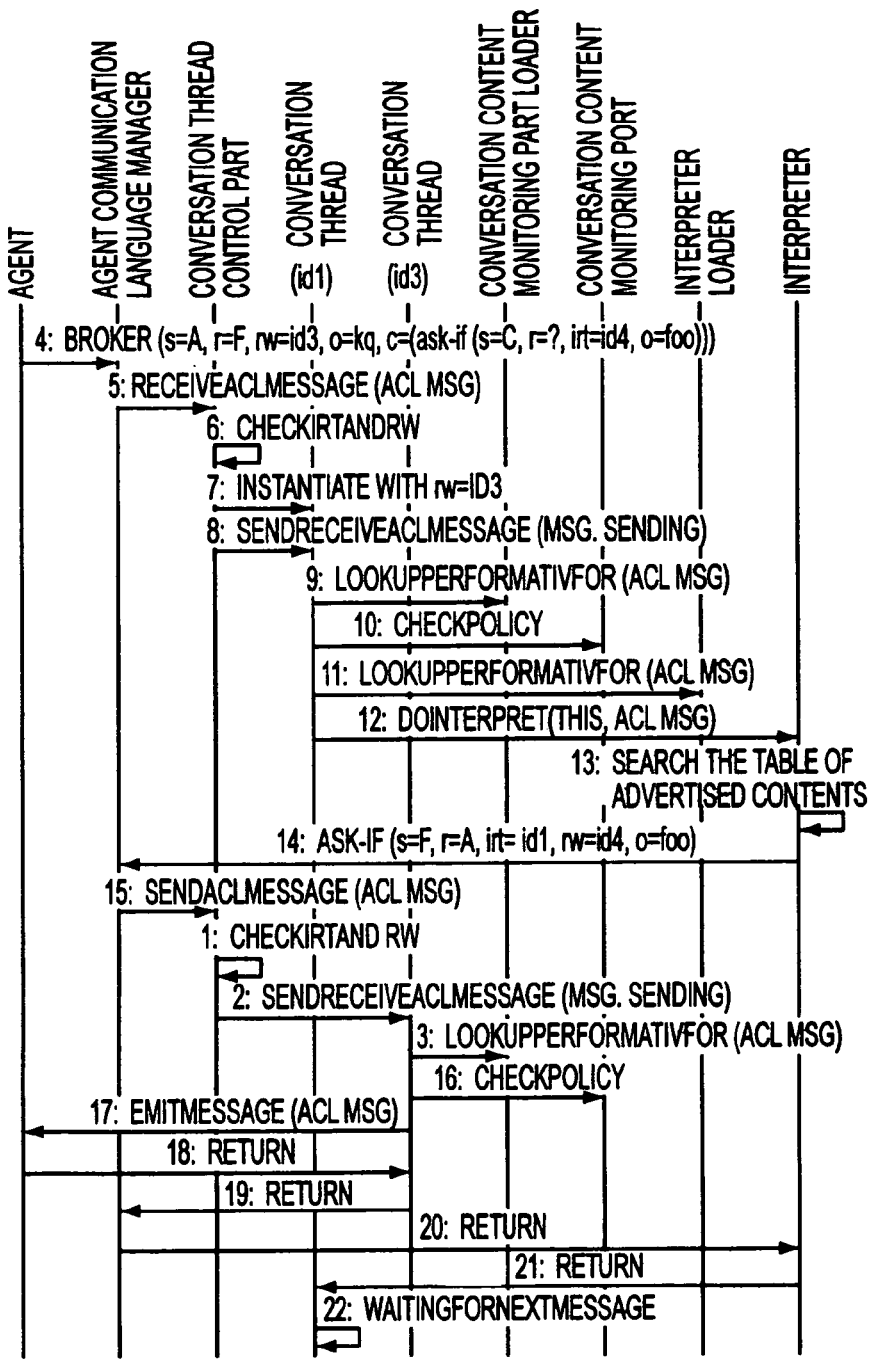
FIG. 15 is an object interaction diagram among the components in a preferred embodiment of this invention.

FIG. 15 is an object interaction diagram which illustrates an exemplary interaction among the components of one preferred embodiment of this invention.

As described above, this invention provides a communication system which is capable of conversing with an agent communication language which is intuitively understandable to a human being in communication among agents (mobile or resident agents).

In one of the aspects of this invention, a message processing system is provided which enables a high speed processing by reducing unnecessary decision logics.

In another aspect of this invention, a communication system is provided in which agents can communicate with each other without being conscious of a variety of agent communication languages and communication protocols.

In still another aspect of this invention, a communication system is provided which realizes a high speed parallel conversation processing.

In a further aspect of this invention, the work and the time required for developing and maintaining a program are reduced as much as possible in providing a support to communication among agents.

In still a further aspect of this invention, a message processing system is provided which is capable of flexibly dealing with conversation among agents.

In another aspect of this invention, a message processing system is provided which gives less load to a communication network.

In still another aspect of this invention, a message processing system is provided in which resources required for execution are decreased.

Although described in the context of preferred embodiments, it should be realized that a number of modifications to these teachings may occur to one skilled in the art. While the invention has been particularly shown and described with respect to preferred embodiments thereof, it will be understood by those skilled in the art that changes in form and details may be made therein without departing from the scope and spirit of the invention.

What is claimed is:

1. A message processing method for execution by a message processor of a mobile agent, the method comprising the steps of:
   connecting the message processor to a network adapted to communicate among multiple computer nodes, to receive conversations having message packets;
   receiving message packets;
   actively processing said message packets of said conversations during said communication of said conversations, said processing comprising the steps of:
      detecting destination information and conversation thread identifying information from at least one of said message packets;
      determining whether said detected conversation thread identifying information corresponds to conversation thread identifying information existing in the message processor;
      generating new conversation thread identifying information when it is determined that the detected conversation thread identifying information does not exist in the message processor;
      passing control to the existing conversation thread, when it is determined that the detected conversation thread exists in the message processor;

sending said at least one message packet with said mobile agent to a message processor at the destination which corresponds to the detected destination information;

detecting the agent communication language of said message processor at the detected destination; and converting the agent communication language of said message packet to the agent communication language of said message processor at the detected destination to allow processing at said destination.

2. A message processing method as set forth in claim 1, further comprising, prior to the step of sending, a step of converting the message packet to a protocol which corresponds to the network to which the message processor is connected.

3. A message processing method for execution by a message processor of a mobile agent, as set forth in claim 1, wherein a plurality of message packets, each containing a destination information and a conversation thread identifying information, are detected and wherein said step of determining whether a conversation thread corresponding to the conversation thread identifying information is performed for each of said plurality of message packets and said step of generating a new conversation thread is performed for each message packet when it is determined that the corresponding conversation thread does not exist in the message processor, and further wherein said steps are performed for each of said message packets asynchronously.

4. A message processing method for execution by a message processor of a mobile agent, as set forth in claim 3, further comprising a step of passing a control to the corresponding conversation thread of each of said plurality of message packets, when it is determined that the corresponding conversation thread of said packet exists in the message processor.

5. A recording media which stores therein a message processing program of a mobile agent for execution by a message processor which is connected to a network for communicating conversations containing message packets among multiple computer nodes, said message processing program comprising:

a program code which instructs said message processor to actively process said message packets of said conversations during said communication of said conversations, to detect a message packet containing a destination information and a conversation thread identifying information;

a program code which instructs said message processor to determine whether a conversation thread corresponding to the conversation thread identifying information contained in said message packet exists in said message processor;

a program code which instructs said message processor to generate a New conversation thread when it is determined that said, corresponding conversation thread does not exist in said message processor;

a program code which instructs said message processor to pass control to said corresponding conversation thread when it is determined that said corresponding conversation thread exists in said message processor;

a program code which instructs said message processor to send said message packet to a destination which corresponds to said destination information; and a program code which instructs said message processor to translate said message packet to an agent language at said destination.

6. A recording media as set forth in claim 5, wherein said message processing program further comprises a program code which instructs said message processor to convert said message packet to a protocol which corresponds to the network to which said message processor is connected.

7. A recording media which stores therein a message processing program of a mobile agent for execution by a message processor which is connected to a network, as set forth in claim 5, wherein a plurality of message packets are detected which contain a destination information and a conversation thread identifying information, and said program code instructs said message processor to determine, for each of said message packets, whether a conversation thread corresponding to said conversation thread identifying information contained in each of said message packets exists in said message processor, and said program code further instructs said message processor to generate a New conversation thread for each of said message packets when it is determined that said corresponding conversation thread does not exist in said message processor; and said message packets are processed asynchronously.

8. A recording media which stores therein a message processing program of a mobile agent for execution by a message processor which is connected to a network, as set forth in claim 7, wherein said program code further instructs said message processor to pass control to the corresponding conversation thread of each of said plurality of message packets, when it is determined that the corresponding conversation thread of said packet exists in the message processor.

9. A communication system for processing multiple computer conversations having units of conversation comprising message packets which are transmitted among multiple computer nodes, said system comprising:

a network for communicating said units of conversation among multiple computer nodes;

a message processor in one of said computer nodes adapted for actively processing said message packets of said conversations during said communication of said conversations, said message packets having mobile agents operatively associated therewith, said message processor further comprising:

a protocol manager for converting said message packet to a protocol which corresponds to said network to which said message processor is connected; and an agent language translator for converting said message packet to an agent language at said destination;

a conversation thread control part for detecting destination information and conversation thread identifying information contained in said message packet, said conversation thread control part, said conversation thread control part further comprising:

a memory for storing conversation thread identifying information;

a program code for determining whether a conversation thread corresponding to said detected conversation thread identifying information exists in said message processor;

a program code for generating a New conversation thread when it is determined that said corresponding conversation thread does not exist in said message processor;

a program code for passing control of said message packet to said corresponding conversation thread when it is determined that said detected conversation thread exists in said message processor; and a program code for sending said message packet with said mobile agent to a destination which corresponds to said destination information.

10. A communication system, according to claim 9, wherein said conversation thread control part detects destination information and conversation thread identifying information of a plurality of message packets, said conversation thread control part further determining, for each of said message packets, whether a conversation thread corresponding to said conversation thread identifying information contained in each of said message packets exists in said message processor, and said conversation thread control part generating a New conversation thread for each of said message packets when it is determined that said corresponding conversation thread does not exist in said message processor; and said message packets are processed asynchronously.

11. A communication system, according to claim 10, wherein said conversation thread control part passes control to the corresponding conversation thread of each of said plurality of message packets, when it is determined that the corresponding conversation thread of said packet exists in the message processor.

* * * * *